US011187152B1

(12) United States Patent
Happ et al.

(10) Patent No.: US 11,187,152 B1
(45) Date of Patent: Nov. 30, 2021

(54) TURBOMACHINE SEALING ARRANGEMENT HAVING A COOLING FLOW DIRECTOR

(71) Applicant: General Electric Company, Schenectady, NY (US)

(72) Inventors: Emily Klara Happ, Greenville, SC (US); Lucas John Stoia, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/038,370

(22) Filed: Sep. 30, 2020

(51) Int. Cl.
*F01D 25/12* (2006.01)
*F02C 7/18* (2006.01)
*F02C 7/28* (2006.01)

(52) U.S. Cl.
CPC ............. *F02C 7/18* (2013.01); *F01D 25/12* (2013.01); *F02C 7/28* (2013.01); *F05D 2240/55* (2013.01); *F05D 2260/221* (2013.01)

(58) Field of Classification Search
CPC .... F01D 25/24; F02C 7/18; F02C 7/28; F05D 2240/55; F05D 2260/221
See application file for complete search history.

(56) References Cited

U.S. PATENT DOCUMENTS

| 4,920,742 | A | 5/1990 | Nash et al. | |
|---|---|---|---|---|
| 6,071,083 | A | 6/2000 | Kakovitch | |
| 6,412,268 | B1 * | 7/2002 | Cromer | F01D 25/12 60/772 |
| 6,557,350 | B2 | 5/2003 | Farmer et al. | |
| 6,675,584 | B1 * | 1/2004 | Hollis | F01D 9/023 60/796 |
| 7,464,554 | B2 | 12/2008 | Cheung et al. | |
| 8,079,219 | B2 | 12/2011 | Johnson et al. | |
| 2004/0031270 | A1 * | 2/2004 | Sileo | F01D 9/023 60/796 |
| 2004/0031271 | A1 * | 2/2004 | Jorgensen | F02C 7/20 60/796 |
| 2008/0202124 | A1 * | 8/2008 | Sutcu | F01D 9/023 60/796 |
| 2012/0234018 | A1 * | 9/2012 | Cihlar | F01D 25/12 60/796 |

(Continued)

FOREIGN PATENT DOCUMENTS

EP 0344877 B1 7/1992
EP 1258682 A2 11/2002

*Primary Examiner* — Igor Kershteyn
(74) *Attorney, Agent, or Firm* — Dority & Manning, P.A.

(57) ABSTRACT

A sealing arrangement includes a transition duct having an aft frame that circumferentially surrounds the downstream end of the transition duct. The aft frame defines a cooling circuit that has an outlet configured to direct cooling air in a radial direction. A first stage nozzle is spaced apart from the aft frame and defines a gap therebetween. A sealing assembly that extend circumferentially along at least a portion of the aft frame and is coupled to the aft frame. The sealing assembly includes a flexible sealing element that extends from the aft frame, across the gap, to the first stage nozzle. The flexible sealing element is forced into sealing engagement with the first stage nozzle by pressure from a compressed working fluid. A cooling flow director that is disposed between the outlet of the cooling circuit and the flexible sealing element.

20 Claims, 4 Drawing Sheets

(56) References Cited

U.S. PATENT DOCUMENTS

| | | | |
|---|---|---|---|
| 2012/0292861 A1* | 11/2012 | Moehrle | F01D 9/023 |
| | | | 277/641 |
| 2018/0051578 A1* | 2/2018 | Marlow | F01D 25/12 |
| 2018/0058331 A1* | 3/2018 | Barton | F02C 3/04 |
| 2019/0113230 A1* | 4/2019 | Simmons | F01D 9/023 |

\* cited by examiner

TURBOMACHINE SEALING ARRANGEMENT HAVING A COOLING FLOW DIRECTOR

FIELD

The present disclosure relates generally to a sealing arrangement for a turbomachine. In particular, the present disclosure relates to an improved sealing arrangement between an aft frame and a first stage turbine nozzle.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The combustion section of a gas turbine typically includes combustors that are coupled to a stage-one nozzle of the turbine section via transition ducts. Typically, each transition duct has an aft frame positioned adjacent to an inlet side of the turbine section. The aft frame will usually have two arcuate portions which are typically referred to as inner and outer portions, being inner and outer in the radial direction with respect to the centerline axis of the turbine. The inner and outer portions of the aft frame are interconnected by radially extending linear portions, often referred to as side portions. A sealing assembly is typically used to seal between the aft frame and the inlet of the turbine section. In particular, inner and outer circumferential seals are used to seal between the inner and outer portions of the aft frame and the corresponding inlet of the turbine section. Likewise, radially oriented side seals can be disposed between adjacent aft frames to substantially close and seal off the circumferential gaps between the side portion of one aft frame and the next aft frame.

The sealing assembly positioned about the aft frame generally functions to prevent high temperature combustion gases from escaping the gas turbine engine prior to entrance into the turbine section. However, issues exist with the use of many known sealing assemblies. For example, the high temperature of the combustion gases can cause damage to the sealing assembly over time, which may result in a limited life and decreased durability of the assembly. Accordingly, an improved sealing assembly is desired in the art. In particular, an improved sealing assembly for a gas turbine engine that has increased heat protection capabilities, thereby prolonging the overall life and durability of the assembly, is desired.

BRIEF DESCRIPTION

Aspects and advantages of the sealing arrangements and turbomachines in accordance with the present disclosure will be set forth in part in the following description, or may be obvious from the description, or may be learned through practice of the technology.

In accordance with one embodiment, a sealing arrangement is provided. The sealing arrangement includes a transition duct having an upstream end and a downstream end. The transition duct includes an aft frame that circumferentially surrounds the downstream end of the transition duct. The aft frame defines a cooling circuit that has an outlet configured to direct cooling air in a radial direction. The sealing arrangement also includes a first stage nozzle spaced apart from the aft frame and defining a gap therebetween. The sealing arrangement further includes a sealing assembly that extends circumferentially along at least a portion of the aft frame and is coupled to the aft frame. The sealing assembly includes a flexible sealing element that extends from the aft frame, across the gap, to the first stage nozzle. The flexible sealing element is forced into sealing engagement with the first stage nozzle by pressure from a compressed working fluid. The sealing assembly further includes a cooling flow director that is disposed between the outlet of the cooling circuit and the flexible sealing element.

In accordance with another embodiment, a turbomachine is provided. The turbomachine includes a compressor section, a combustor section, and a turbine section. The combustor section includes a plurality of combustors. Each combustor includes a transition duct that has an upstream end and a downstream end. the transition duct includes an aft frame that circumferentially surrounds the downstream end of the transition duct. The aft frame defines a cooling circuit having an outlet configured to direct cooling air in a radial direction. The turbine section includes a first stage nozzle spaced apart from the aft frame. A gap is defined between the first stage nozzle and the aft frame. A sealing assembly extends circumferentially along at least a portion of the aft frame and is coupled to the aft frame. The sealing assembly includes a flexible sealing element that extends from the aft frame, across the gap, to the first stage nozzle. The flexible sealing element is forced into sealing engagement with the first stage nozzle by pressure from a compressed working fluid. The sealing assembly further includes a cooling flow director that is disposed between the outlet of the cooling circuit and the flexible sealing element.

These and other features, aspects and advantages of the present sealing arrangements and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present sealing arrangements and turbomachines, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present sealing arrangements and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 1:
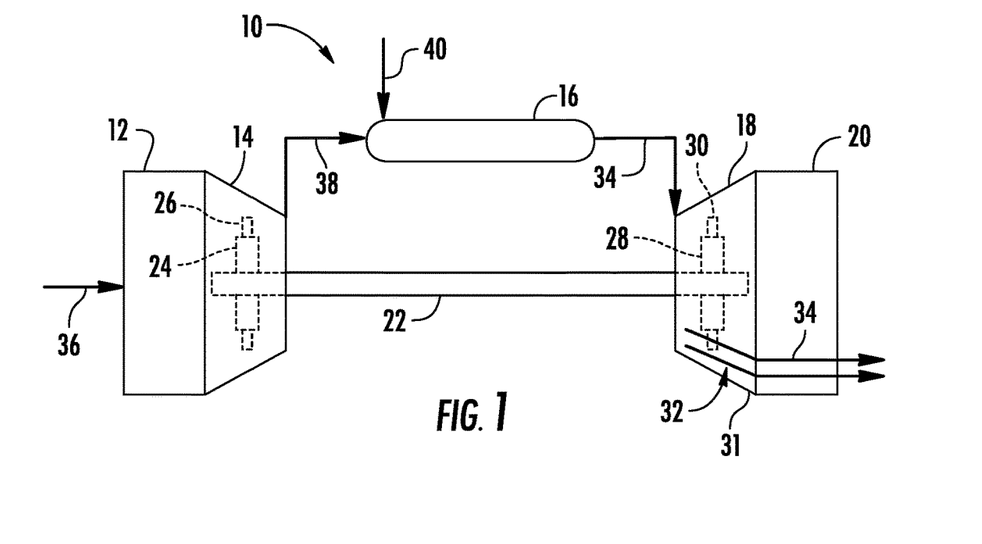
FIG. 1 is a schematic illustration of a turbomachine in accordance with embodiments of the present disclosure.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air 36 flows through the inlet section 12 and into the compressor section 14 where the air 36 is progressively compressed, thus providing pressurized air or compressed air 38 to the combustors 17 (FIG. 2) of the combustor section 16. The compressed air 38 is mixed with fuel 40 and burned within each combustor 17 (FIG. 2) to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
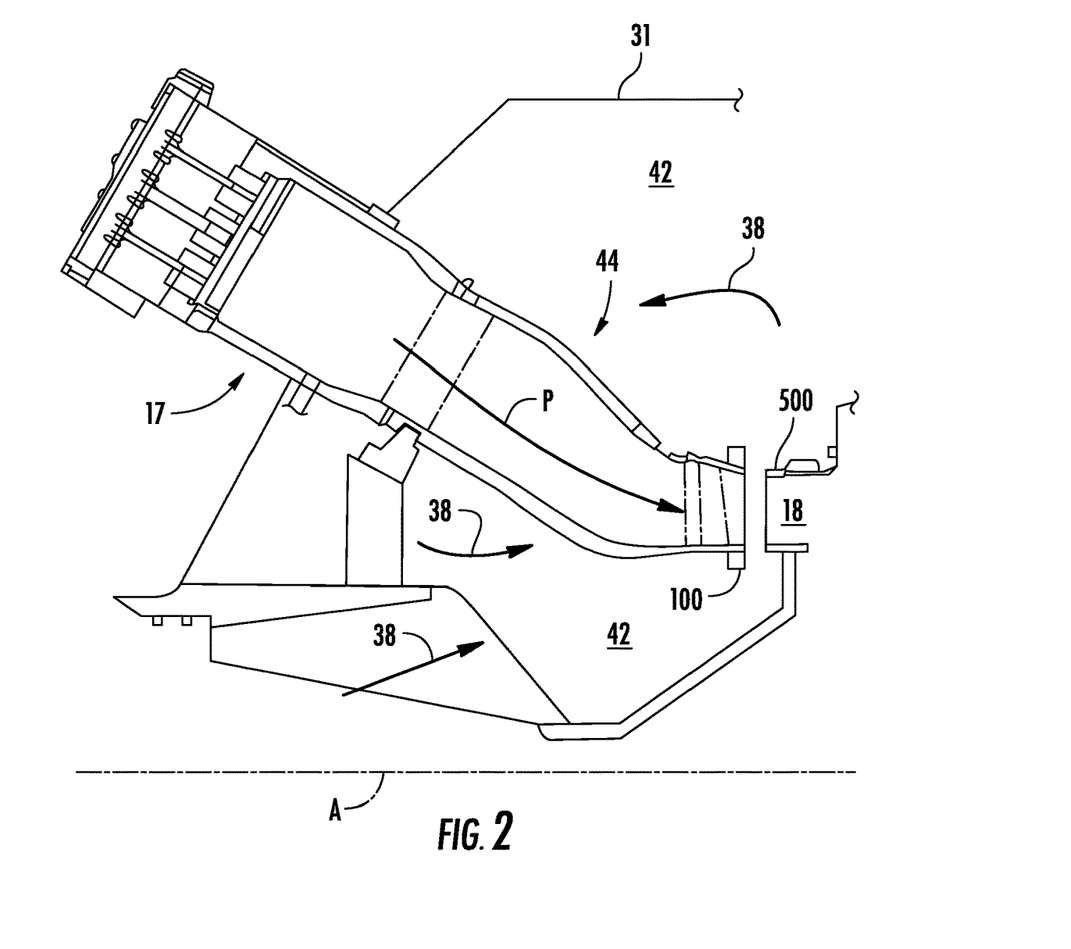
FIG. 2 illustrates a section view of a combustor in accordance with embodiments of the present disclosure.

As shown in FIG. 2, a combustor 17 may be at least partially surrounded by an outer casing 31 such as a compressor discharge casing. The outer casing 31 may at least partially define a high pressure plenum 42 that at least partially surrounds various components of the combustor 17, such as transition duct 44. The high pressure plenum 42 may be in fluid communication with the compressor 14 (FIG. 1) so as to receive the compressed air 38 therefrom. As illustrated in FIG. 2, the combustor 17 may be connected to a stage-one nozzle 500 of turbine 18 via a transition duct 44 including an aft frame 100. The transition duct 44 defines a flow path P. Also shown in FIG. 2 is the central axis A of turbine 18, which defines an axial direction substantially parallel to and/or along axis A, a radial direction R (FIG. 3) perpendicular to axis A, and a circumferential direction C (FIG. 3) extending around axis A.

Figure 3:
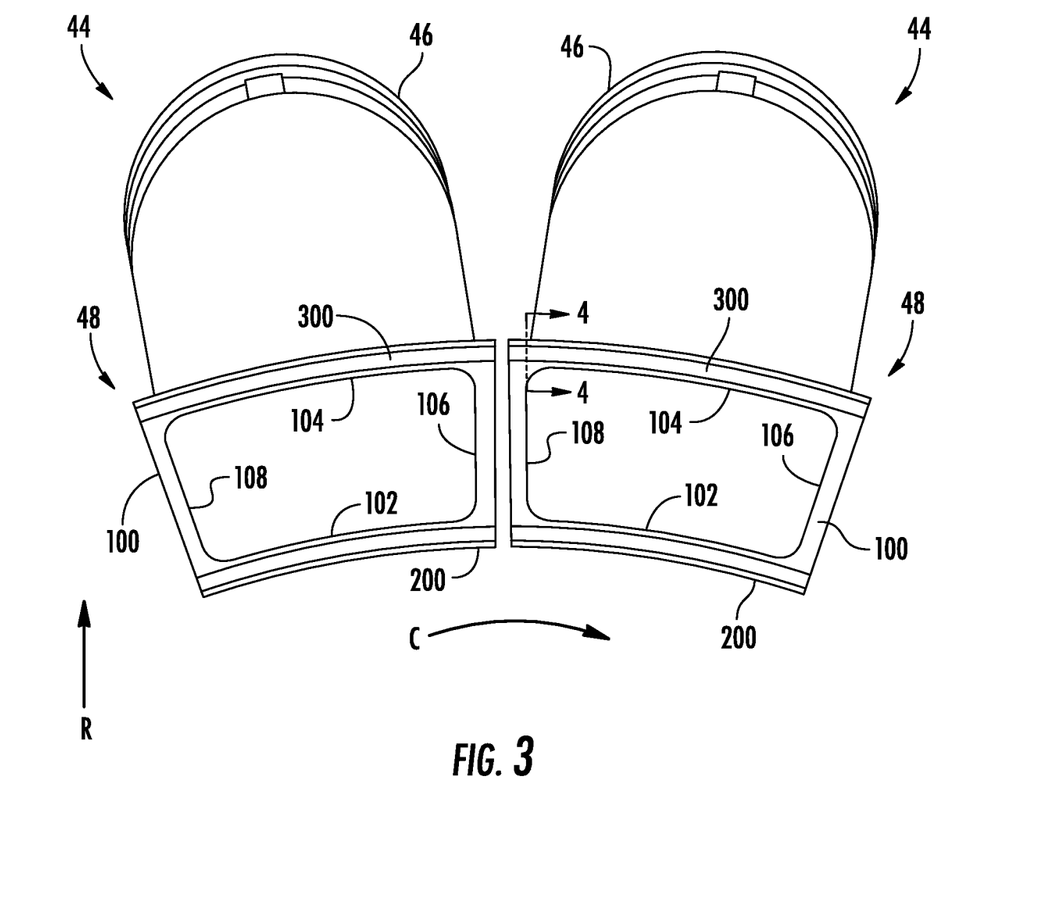
FIG. 3 illustrates a perspective view of circumferentially adjacent transition ducts in accordance with embodiments of the present disclosure.
Figure 4:
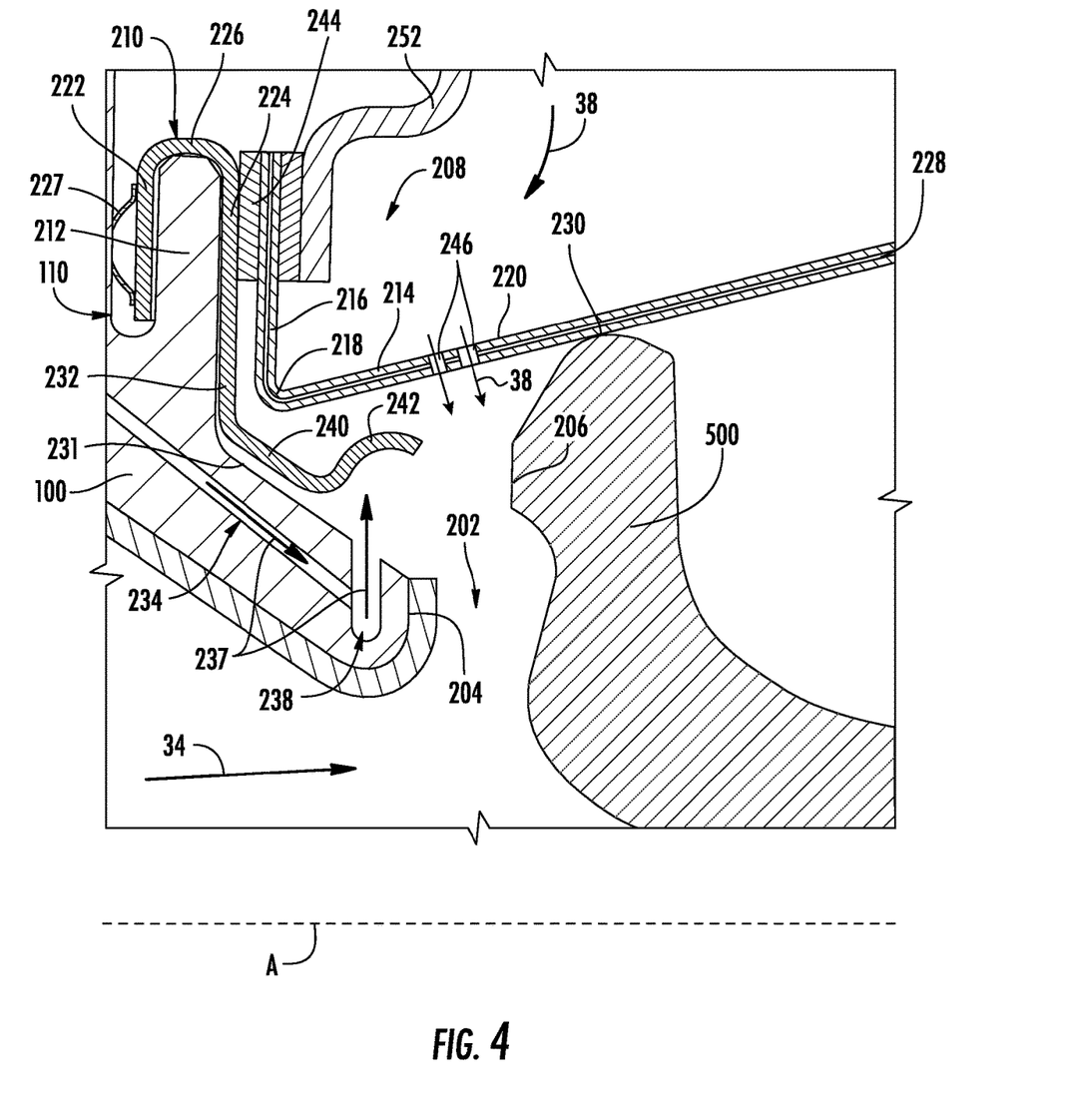
FIG. 4 illustrates a cross sectional perspective view of a sealing arrangement in accordance with embodiments of the present disclosure.

Referring now to FIG. 3, a pair of circumferentially arranged transition ducts 44 are illustrated, each having an upstream end 46 and a downstream end 48. An aft frame 100 surrounds the respective downstream end 48. As illustrated in FIG. 3, in some embodiments, the aft frame 100 may have an inner portion 102 and an outer portion 104, with a pair of opposing side portions 106 and 108 that extend radially between the inner and the outer portions 102 and 104. Also illustrated in FIG. 3 is an inner seal 200 and an outer seal 300 respectively disposed on the inner portion 102 and outer portion 104 of each aft frame 100. Aft frame 100 may include a notch or slot 110 (as shown in FIG. 4) for receiving inner seal 200 and/or outer seal 300. In some embodiments, a notch 110 may extend fully around the perimeter of the aft frame 100 (e.g., notch 110 may be continuous through the side portions 106 and 108 and the inner and the outer portions 102 and 104) for receiving both inner seal 200 and outer seal 300 as well as a radially-oriented side seal (not shown) which may be provided between adjacent aft frames 100. It is also possible in some embodiments to provide separate slots or notches for each of the seals 200, 300, and 400.

As shown in FIG. 3, inner seal 200 and outer seal 300 may be circumferentially oriented with respect to a circumferential direction C of the gas turbine 10. For example, each inner seal 200 is circumferentially aligned with the other inner seal 200 on the adjacent aft frame 100, and each outer seal 300 is circumferentially aligned with the other outer seal 300 on the adjacent aft frame 100. Thus, inner seals 200 and outer seals 300 may be collectively referred to as circumferentially-oriented seals.

In the description herein, certain features of the aft frame 100, stage-one nozzle 500, and seals, 200, 300, and 400, will be described with reference to one or the other of inner portion 102/inner seal 200 and outer portion 104/outer seal 300, nonetheless, it will be recognized by one of ordinary skill in the art that such features can be associated with either or both of inner portions 102 and/or outer portions 104.

FIG. 4 illustrates a cross-sectional view of an exemplary sealing arrangement 201, which depicts the outer portion 104 of the aft frame 100 and outer seal 300, in accordance with embodiments of the present disclosure. As mentioned above, the sealing arrangement 201 includes a transition duct 44 having an upstream end 46 and a downstream end 48 (FIG. 3). In many embodiments, an aft frame 100 circumferentially surrounds the downstream end 48 of the transition duct 44 (FIG. 3). A first stage nozzle 500 of turbine 18 may be spaced apart from the aft frame 100 and may define a gap 202 between the first stage nozzle 500 and the aft frame 100. Specifically, the first stage nozzle 500 and the aft frame 100 may be axially spaced apart to allow for movement and/or thermal expansion of the first stage nozzle 500 and/or the aft frame 100 during operation of the gas turbine 10. In various embodiments, the gap 202 may be defined axially between an aft face 204 of the aft frame 100 and a forward face 206 of the first stage nozzle 500.

As shown in FIG. 4, the outer portion 104 of the aft frame 100 may define a cooling circuit 234 that functions to cool various components of the sealing arrangement 201. As shown, the cooling circuit 234 may include a cooling channel 236 that extends along the aft frame 100. In many embodiments, the cooling channel 236 may diverge radially inward with respect to the axial centerline A of the gas turbine 10 in the direction of combustion gas 34 flow within the aft frame 100 (from upstream end to downstream end). The cooling circuit 234 may further include an outlet 238 that is fluidly coupled to the cooling channel 236 and positioned immediately downstream of the cooling channel 236 with respect to a flow of cooling air 237 traveling therethrough. The outlet 238 may extend generally radially within the aft frame 100 and may be positioned proximate an aft face 204 to provide cooling to the aft face 204. As shown in FIG. 4. The outlet 238 of the cooling circuit 234 may function to direct the flow of cooling air 237 radially outward, i.e. parallel to the radial direction R, and towards the various components of a sealing assembly 208.

As shown in FIG. 4, the sealing arrangement 201 includes a sealing assembly 208 that couples to the aft frame 100 via the notch 110. In various embodiments, the sealing assembly 208 may be the outer seal 300 discussed herein. As shown, the sealing assembly 208 may be positioned radially outward from the cooling circuit 234. The sealing assembly 208 may extend entirely along the outer portion 104 and/or the inner portion 102 of the aft frame 100, i.e. in the circumferential direction C (FIG. 3). In many embodiments, the sealing assembly 208 may be an outer seal 300 and/or an inner seal 200.

In many embodiments, the sealing assembly 208 may include a flexible sealing element 214 that extends from the aft frame 100, across the gap 202, to the first stage nozzle 500. The flexible sealing element 214 may be composed primarily of a cloth material, which can be a woven mesh cloth of a suitable metal material, e.g., alloy L605. In some embodiments, the materials of the flexible sealing element 214 may be layered, e.g., a single sheet of cloth material may be folded over on itself as illustrated in FIG. 4, and/or multiple layers of cloth material may be welded together.

As shown in FIG. 4, the flexible sealing element 214 may include a first portion 216 that extends generally radially, a bend 218, and a second portion 220 that extends generally axially. The flexible sealing element 214 may be one continuous metal sheet and/or metal woven mesh cloth that extends between the first portion 216, the bend 218, and the second portion 220 without any breaks, joints, and/or seams. The bend 218 may be disposed at the intersection of the first portion 216 and the second portion 220 and may transition the flexible sealing element 214 from a generally radial orientation to a generally axial orientation with respect to the axial centerline A of gas turbine 10.

The second portion 220 of the flexible sealing element 214 may extend directly from the bend 218 to a free end 228. In many embodiments, the second portion 220 of the flexible sealing element 214 may terminate at the free end 228. In various embodiments, as shown in FIG. 4, the second portion 220 of the flexible sealing element 214 may diverge radially outwardly with respect to the axial centerline A of the gas turbine 10 as it extends from the bend 218 to the free end 228. The second portion 220 of the flexible sealing element 214 may be in contact with a radially outer surface 230 of the first stage nozzle 500 at a location defined between the bend 218 and the free end 228.

In many embodiments, the flexible sealing element 214 may be forced into sealing engagement with the first stage nozzle 500 by pressure from a compressed working fluid, such as the compressed air 38 (FIG. 2). More specifically, the pressure from the compressed air 38 within the high pressure plenum 42 may force the second portion 220 of the flexible sealing element 214 to sealingly engage with the outer surface 230 of the first stage nozzle 500, which advantageously prevents combustion gases 34 from escaping when transitioning from the aft frame 100 to the first stage nozzle 500.

As shown in FIG. 4, the sealing assembly 208 may further include a cooling flow director 232 that is positioned at least partially between the aft frame 100 and the flexible sealing element 214. In various embodiments, the flexible sealing element 214 and the cooling flow director 232 may be spaced apart from one another and include portions generally parallel to one another. In many embodiments, the cooling flow director 232 may be positioned at least partially between the cooling circuit 234 and the flexible sealing element. In various embodiments, the cooling flow director 232 may function to direct the flow of cooling air 237 exiting the outlet 238 away from the flexible sealing element 214 thereby purging combustion gases 34 from the gap 202. For example, as discussed above, the outlet 238 of the cooling circuit 234 may direct the flow of cooling air 237 to impinge upon the cooling flow director 232. As a result, the flow of cooling air 237 is then directed away from the flexible sealing element 214 and towards the gap 202, which dilutes the high temperature combustion gases 34 and prevents them from damaging the flexible sealing element 214.

As shown in FIG. 4, the cooling flow director 232 may include a U-shaped portion 210 in contact with the aft frame 100, a middle portion 240 that extends from the U-shaped portion 210 and is at least partially parallel to the aft frame 100, and a director portion 242 that extends from the middle portion 240. The U-shaped portion of the cooling flow director 232 may couple the entire sealing assembly 208 to the aft frame 100. For example, the sealing assembly 208 may be secured to the aft frame 100 via a U-shaped portion 210, which extends into the notch 110 and around a support member 212 defined by the aft frame 100. The U-shaped portion may be constrained within the notch 110 to prevent movement of the sealing assembly 208 during operation of the gas turbine 10. As shown, the support member 212 may extend radially outward from the aft frame 100 and into the U-shaped portion 210, such that the U-shaped portion 210 is entirely in contact with the support member 212. In many embodiments, as shown in FIG. 4, the U-shaped portion 210 of the cooling flow director 232 may be positioned axially inward of the flexible sealing element 214.

In many embodiments, the U-shaped portion 210 includes a forward segment 222 that extends generally radially, an aft segment 224 that is spaced apart from the forward segment 222 and extends generally radially, and a middle segment 226 that extends generally axially between the forward segment 222 and the aft segment 224. As shown in FIG. 4, the aft segment 224 may be longer than the forward segment 222 of the U-shaped portion 210. Similarly, the aft segment 224 of the U-shaped portion 210 may be longer than the first portion 216 of the flexible sealing element 214. In some embodiments, the sealing arrangement 201 may include a seal 227, such as a D-seal or other suitable seal, that is coupled to the forward segment 222 of the U-shaped portion 210. The seal 227 may be disposed between the notch 110 and the forward segment 222 of the U-shaped portion 210, such that the seal 227 biases the U-shaped portion 210 against the support member 212 of the aft frame 100 to prevent the sealing assembly 208 from decoupling from the aft frame 100.

In some embodiments, the first portion 216 of the flexible sealing element 214 may be coupled to, and extend from, the U-shaped portion 210. More specifically, the first portion 216 of the flexible sealing element 214 may be coupled to the aft segment 224 of the U-shaped portion 210. As shown, the flexible sealing element 214 may be spaced apart from the aft frame 100 by the U-shaped portion, such that the flexible sealing element 214 does not contact the aft frame 100. In other embodiments, as shown in FIG. 4, a spacer 244 may be disposed between the flexible sealing element 214 and the U-shaped portion 210, such that the flexible sealing element 214 and the U-shaped portion 210 are spaced apart and do not contact each other. More specifically, the spacer may be positioned axially between the aft segment 224 of the U-shaped portion 210 and the first portion 216 of the flexible sealing element 214.

In some embodiments, as discussed above, the middle portion 240 of the cooling flow director 232 may extend directly from the aft segment 224 of the U-shaped portion 210. As shown in FIG. 4, the middle portion 240 of the cooling flow director 232 may be spaced apart from an outer surface 231 of the aft frame 100. Further, in various embodiment, the middle portion 240 may extend generally parallel to both the outer surface 231 of the aft frame 100 and the cooling channel 236. In many embodiments, the middle portion 240 of the cooling flow director 232 may converge radially inwardly from the U-shaped portion 210 to the director portion 242 with respect to the axial centerline A of the gas turbine 10.

As shown in FIG. 4, the director portion 242 of the cooling flow director 232 may extend directly from the middle portion 240. In many embodiments, the director portion may be arcuate and may have an "S" shaped cross section. For example, the director portion 242 may curve radially outwardly from the middle portion 240 and subsequently curve radially inwardly. The director portion 242 of the cooling flow director 232 may be positioned directly radially outward of the outlet 238 of the cooling circuit 234, such that there are no intervening components between the outlet 238 of the cooling circuit 234 and the director portion 242. The director portion 242 of the cooling flow director 232 may function to direct the flow of cooling air 237 exiting the outlet 238 away from the flexible sealing element 214 thereby purging combustion gases 34 from the gap 202. For example, as discussed above, the outlet 238 of the cooling circuit 234 may direct the flow of cooling air 237 to impinge upon the director portion 242. As a result, the flow of cooling air 237 is then directed away from the flexible sealing element 214 and towards the gap 202, which prevents the high temperature combustion gases 34 from damaging the flexible sealing element 214.

As shown in FIG. 4, the flexible sealing element 214 may further define a plurality of cooling holes 246. More specifically, the plurality of cooling holes 246 may be defined within the second portion 220 of the flexible sealing element 214 and oriented towards the gap 202. The plurality of cooling holes 246 may function to advantageously direct compressed working fluid, e.g. compressed air 38 from the high pressure plenum 42, into the gap 202 to prevent combustion gases 34 from damaging the flexible sealing element 214, i.e. the plurality of cooling holes 246 purge the combustion gases 34 from the gap 202.

Figure 5:
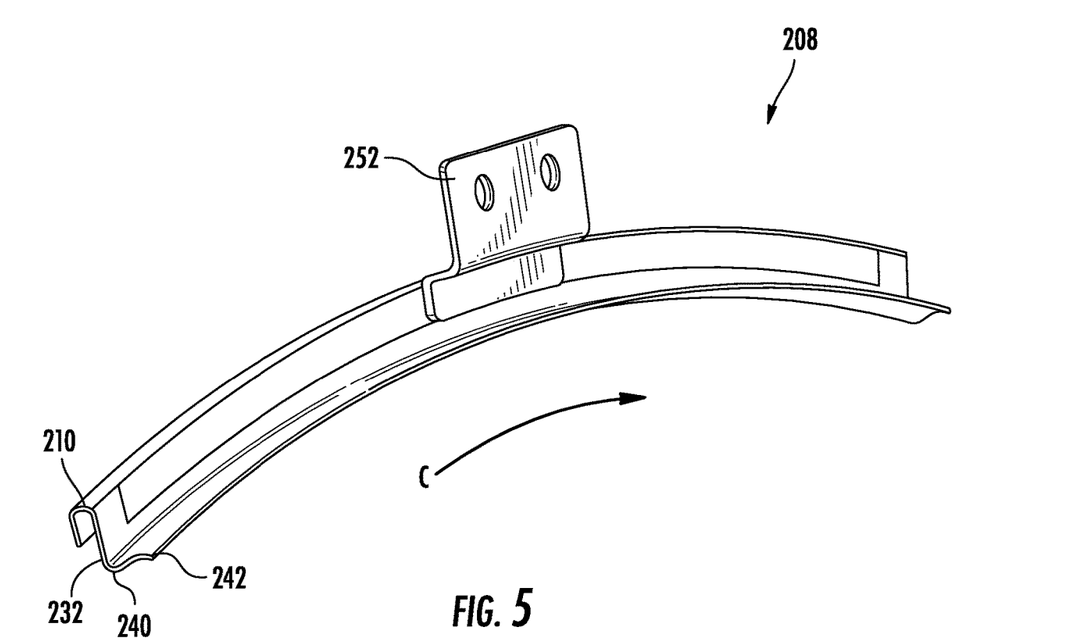
FIG. 5 illustrates a perspective view of a sealing assembly without a flexible sealing element in accordance with embodiments of the present disclosure.
Figure 6:
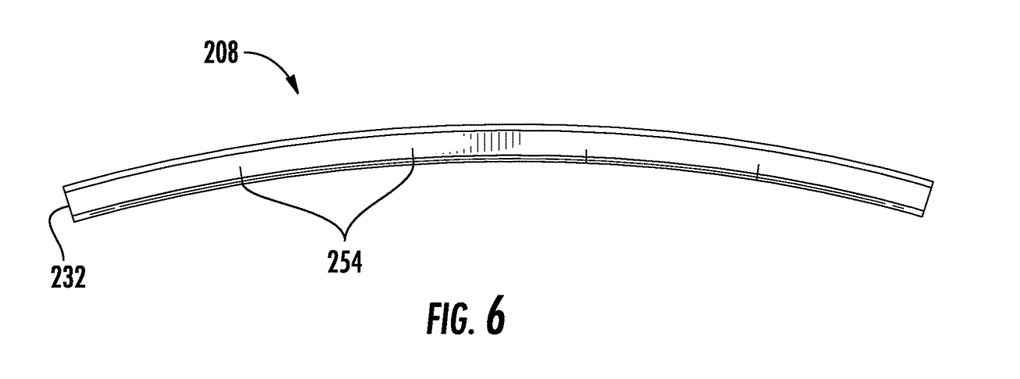
FIG. 6 illustrates a perspective view of a sealing assembly without a flexible sealing element in accordance with embodiments of the present disclosure.

FIGS. 5 and 6 illustrate perspective views of the sealing assembly 208 without the flexible sealing element 214 in place. As shown, the sealing assembly 208 may extend in the circumferential direction C and may be generally arcuate. In many embodiments, the sealing assembly may have the same curved shape and/or profile as the outer portion 104 and/or the inner portion 102 of the aft frame 100 in order to fully couple to the aft frame 100 (as shown in FIG. 3). The sealing assembly 208 may further include a flange 252 that may be bolted or otherwise coupled to the aft frame 100, in order to further secure the sealing assembly 208 to the aft frame 100. As shown in FIG. 6, the cooling flow director 232 may further include a plurality of stress relief cuts 254 circumferentially spaced apart from one another along cooling flow director 232, such that the curve of the cooling flow director 232 does not experience high thermal stresses during operation of the gas turbine 10.

In operation of the gas turbine 10, combustion gases 34 flow through the transition duct of combustor 17 and exit at the aft frame 100. At which point, the combustion gases transition from the combustor 17 to the inlet of the turbine section 18 at the first stage nozzle 500. The flexible sealing element 214 may be disposed between the aft frame 100 and the first stage nozzle 500 to ensure that no combustion gases 34 escape during the transition into the turbine section 18. The flexible sealing element 214 is advantageously protected from the high heat of the combustion gases 34 by the cooling flow director 232. For example, the cooling flow director 232 is positioned radially outward from the outlet 238 of the cooling circuit 234, such that the director portion 242 redirects flow of cooling air 237 exiting the cooling circuit 234 towards the gap 202. As a result, the high temperature combustion gases 34 are diluted with the flow of cooling air 237 and pushed away from the flexible sealing element 214, which gives the flexible sealing element 214 increased durability and overall component life.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A sealing arrangement for a turbomachine, comprising:
a transition duct having an upstream end and a downstream end, the transition duct comprising an aft frame that circumferentially surrounds the downstream end of the transition duct, the aft frame defining a cooling circuit having an outlet configured to direct cooling air in a radial direction;
a first stage nozzle spaced apart from the aft frame and defining a gap therebetween;
a sealing assembly extending circumferentially along at least a portion of the aft frame and coupled to the aft frame, the sealing assembly comprising:
a flexible sealing element extending from the aft frame across the gap to the first stage nozzle, wherein the flexible sealing element is forced into sealing engagement with the first stage nozzle by pressure from a compressed working fluid; and
a cooling flow director disposed between the outlet of the cooling circuit and the flexible sealing element.

2. The sealing arrangement as in claim 1, wherein the cooling flow director is configured to direct the cooling air exiting the outlet away from the flexible sealing element thereby purging combustion gases from the gap.

3. The sealing arrangement as in claim 1, wherein the flexible sealing element comprises a first portion that extends generally radially, a bend, and a second portion that extends generally axially and contacts an outer surface of the first stage nozzle.

4. The sealing arrangement as in claim 3, wherein the second portion of the flexible sealing element comprises a plurality of cooling holes configured to direct compressed working fluid into the gap to prevent combustion gases from contacting the flexible sealing element.

5. The sealing arrangement as in claim 1, wherein the cooling flow director comprises a U-shaped portion that couples the sealing assembly to the aft frame, a middle portion that extends from the U-shaped portion and is generally parallel to the aft frame, and a director portion that extends from the middle portion.

6. The sealing arrangement as in claim 5, wherein the director portion of the cooling flow director is arcuate and disposed directly radially outward of the outlet of the cooling circuit.

7. The sealing arrangement as in claim 5, wherein the aft frame defines a notch and a support member, wherein the U-shaped portion extends into the notch and couples the sealing assembly to the support member.

8. The sealing arrangement as in claim 1, further comprising a spacer positioned between the flexible sealing element and the cooling flow director.

9. The sealing arrangement as in claim 8, wherein the flexible sealing element and the cooling flow director are spaced apart from one another and include portions parallel to one another.

10. The sealing arrangement as in claim 1, wherein the cooling flow director further defines a plurality of stress relief cuts circumferentially spaced apart from one another.

11. A turbomachine, comprising:
a compressor section;
a combustor section having a plurality of combustors, each combustor comprising a transition duct having an upstream end and a downstream end, the transition duct comprising an aft frame that circumferentially surrounds the downstream end of the transition duct, the aft frame defining a cooling circuit having an outlet configured to direct cooling air in a radial direction;
a turbine section having a first stage nozzle spaced apart from the aft frame, wherein a gap is defined between the first stage nozzle and the aft frame;
a sealing assembly extending circumferentially along at least a portion of the aft frame and coupled to the aft frame, the sealing assembly comprising:
a flexible sealing element extending from the aft frame across the gap to the first stage nozzle, wherein the flexible sealing element is forced into sealing engagement with the first stage nozzle by pressure from a compressed working fluid; and
a cooling flow director disposed between the outlet of the cooling circuit and the flexible sealing element.

12. The turbomachine as in claim 11, wherein the cooling flow director is configured to direct the cooling air exiting the outlet away from the flexible sealing element thereby purging combustion gases from the gap.

13. The turbomachine as in claim 11, wherein the flexible sealing element comprises a first portion that extends generally radially, a bend, and a second portion that extends generally axially and contacts an outer surface of the first stage nozzle.

14. The turbomachine as in claim 13, wherein the second portion of the flexible sealing element comprises a plurality of cooling holes configured to direct compressed working fluid into the gap to prevent combustion gases from contacting the flexible sealing element.

15. The turbomachine as in claim 11, wherein the cooling flow director comprises a U-shaped portion that couples the sealing assembly to the aft frame, a middle portion that extends from the U-shaped portion and is generally parallel to the aft frame, and a director portion that extends from the middle portion.

16. The turbomachine as in claim 15, wherein the director portion of the cooling flow director is arcuate and disposed directly radially outward of the outlet of the cooling circuit.

17. The turbomachine as in claim 15, wherein the aft frame defines a notch and a support member, wherein the U-shaped portion extends into the notch and couples the sealing assembly to the support member.

18. The turbomachine as in claim 11, further comprising a spacer positioned between the flexible sealing element and the cooling flow director.

19. The turbomachine as in claim 18, wherein the flexible sealing element and the cooling flow director are spaced apart from one another and include portions parallel to one another.

20. The turbomachine as in claim 11, wherein the cooling flow director further defines a plurality of stress relief cuts circumferentially spaced apart from one another.

\* \* \* \* \*